United States Patent [19]

Yagi et al.

[11] Patent Number: 5,081,170
[45] Date of Patent: Jan. 14, 1992

[54] STABILIZED POLYOLEFIN RESIN COMPOSITION

[75] Inventors: Masaki Yagi, Omiya; Takao Nishina, Kitamoto; Kazuo Sugibuchi, Tokyo, all of Japan

[73] Assignee: Adeka Argus Chemical Co., Ltd., Tokyo, Japan

[21] Appl. No.: 675,016

[22] Filed: Mar. 22, 1991

Related U.S. Application Data

[63] Continuation of Ser. No. 224,066, Jul. 25, 1988, abandoned.

[30] Foreign Application Priority Data

Jul. 31, 1987 [JP] Japan ................. 62-193483

[51] Int. Cl.$^5$ .............................................. C08K 5/36
[52] U.S. Cl. ...................................... 524/99; 524/102; 524/304; 524/399; 524/451
[58] Field of Search ................. 524/102, 99, 304, 399, 524/451

[56] References Cited

U.S. PATENT DOCUMENTS

| | | | |
|---|---|---|---|
| 4,590,231 | 5/1986 | Seltzer et al. | 524/399 |
| 4,703,073 | 10/1987 | Winter et al. | 524/399 |
| 4,812,500 | 3/1989 | Hayden | 524/102 |

OTHER PUBLICATIONS

Kazumi, Kikkawa et al "Antagonism Between Hundered Amine Stabilizers and Sulfur-Containing Compounds" *Polymer Degradation and Stability* 18(1987) pp. 237-245.
Stephen W. Bigger et al, "The Effect of Hindered Amine Light Stabilizers on the Photooxidative Stability of High Density Polyethylene" J. Polymer Science: Part A: Polymer Chemistry, 27, 63-73 (1989).

*Primary Examiner*—Veronica P. Hoke
*Attorney, Agent, or Firm*—Frishauf, Holtz, Goodman & Woodward

[57] ABSTRACT

The present invention provides a stabilized polyolefin resin composition having improved resistances to oxidation and to weather which is prepared by adding (a) a phenol antioxidant, (b) a sulfur antioxidant, (c) a hindered amine light stabilizer and (d) an aliphatic monocarboxylate of a metal belonging to the group Ia or IIb to a polyolefin resin containing an inorganic filler.

6 Claims, No Drawings

STABILIZED POLYOLEFIN RESIN COMPOSITION

This application is a continuation of application Ser. No. 07/224,066, filed July 25, 1988 (abandoned).

BACKGROUND OF THE INVENTION

1. Field of the Invention

This invention relates to a stabilized polyolefin resin composition. More particularly, it relates to a polyolefin resin composition having improved resistances to oxidation and to weather which is prepared by adding a phenol antioxidant, a sulfur antioxidant, a hindered amine light stabilizer and an aliphatic monocarboxylate of a metal belonging to the group Ia or IIb to a polyolefin resin containing an inorganic filler.

2. Description of the Prior Art

It is known that a polyolefin resin such as polyethylene or polypropylene is deteriorated by, for example, heat, light, oxygen or nitrogen oxide and consequently becomes inavailable any more since it is colored or its mechanical strengths are lowered.

In order to prevent such deterioration of a polyolefin resin, there have been applied a number of additives either alone or as various mixtures.

Among these additives, a phenol antioxidant is widely employed as a basic stabilizer. However it can exert only a limited effect when employed alone. Thus it is combined with other additive(s) depending on the purpose of the application. For example, it is combined with a sulfur antioxidant such as a dialkyl thiodipropionate in order to achieve a high heat resistance. Further it is combined with various light stabilizers in order to achieve a high weather resistance. Furthermore it is combined with both of a sulfur antioxidant and a light stabilizer in order to achieve high resistances to heat as well as to weather.

Examples of the light stabilizer to be combined with a phenol antioxidant include benzophenone, benzotriazole and benzoate UV absorbers and hindered amine compounds. In particular, the application of hindered amine light stabilizers such as a polyalkylpiperidine has been more and more increasing since they are noncoloring, exert a high photostabilizing effect and improve the heat resistance.

However it is known that the combined use of a hindered amine light stabilizer and a sulfur antioxidant would offset the effects with each other. In this case, the weather resistance of the obtained product would be particularly lowered. Thus a composition containing a hindered amine light stabilizer is generally free from any sulfur anitoxidant.

A carboxylate of a metal belonging to the group IIa, such as calcium stearate, has been commonly used in order to neutralize a residual catalyst in a polyolefin resin or to improve the lubricity thereof, though this additive would scarcely affect the resistance to heat or to weather thereof.

An inorganic filler such as talc or calcium carbonate is added to a polyolefin resin in order to improve the stiffness, mechanical properties and dimentional accuracy thereof. A polyolefin resin containing an inorganic filler is generally used in a product which should have a high weather resistance, for example, an automotive part or an electrical appliance to be used outdoor or under a fluorescent lamp. Therefore an inorganic filler should be combined with a light stabilizer. A hindered amine light stabilizer is commonly employed therefor since it is noncoloring and can exert a high stabilizing effect.

However the effect of an antioxidant on a polyolefin resin containing an inorganic filler is significantly lower than that on a polyolefin resin free from any inorganic filler. Accordingly a two-component system comprising a phenol antioxidant and a hindered amine light stabilizer cannot give any sufficient heat resistance. Thus it is required to further add a sulfur antioxidant thereto in order to achieve a satisfactory heat resistance. As described above, however, the combined use of a hindered amine light stabilizer and a sulfur antioxidant would significantly lower the effect of the hindered amine light stabilizer in improving the weather resistance. Namely, it is impossible to satisfactorily improve both of the resistances to weather and to heat by this system.

Accordingly there has been urgently required to develop a polyolefin resin composition containing an inorganic filler wherein the combined use of a phenol antioxidant, a sulfur antioxidant and a hindered amine light stabilizer would lower none of the effects of these additives.

SUMMARY OF THE INVENTION

Under these circumstances, the present inventors have conducted extensive studies and consequently found that the decrease in the effect of a hindered amine light stabilizer can be significantly inhibited by simultaneously employing a phenol antioxidant, a sulfur antioxidant, a hindered amine light stabilizer together with an aliphatic monocarboxylate of a metal belonging to the group Ia or IIb and that not only the stability but also the thermal stability of the resulting composition are higher, in some cases, than those of a composition free from any sulfur antioxidant, thus completing the present invention.

Accordingly, the polyolefin resin composition of the present invention is prepared by adding (a) a phenol antioxidant, (b) a sulfur antioxidant, (c) a hindered amine light stabilizer and (d) an aliphatic monocarboxylate of a metal belonging to the group Ia or IIb to a polyolefin resin containing an inorganic filler.

DETAILED DESCRIPTION OF THE INVENTION

Examples of the polyolefin resin to be used in the present invention include poly-α-olefins and α-olefin copolymers such as low-density polyethylene, high-density polyethylene, straight-chain low density polyethylene[ethylene/α-olefin ($C_3$–$C_8$) copolymers such as ethylene/butene-1 copolymer], polypropylene, propylene/ethylene copolymer, polybutene-1, poly-3-methylbutene, poly-4-methylpentene and ethylene/vinyl acetate copolymer.

Examples of the phenol antioxidant (a) to be used in the present invention include 2,6-di-tert-butyl-p-cresol, stearyl (3,5-dimethyl-4-hydroxybenzyl)-thioglycolate, stearyl β-(4-hydroxy-3,5-di-tert-butylphenol)propionate, distearyl 3,5-di-tert-butyl-4-hydroxybenzylphosphonate, 2,4,6-tris(3',5'-di-tert-butyl-4'-hydrohybenzylthio)1,3,5-triazine, distearyl (4-hydroxy-3-methyl-5-tert-butyl)benzylmalonate, 2,2'-methylenebis(4-methyl-6-tert-butylphenol), 4,4'-methylenebis(2,6-di-tert-butylphenol), 2,2'-methylenebis[6-(1-methylcyclohexyl)-p-cresol], bis[3,5-bis(4-hydroxy-3-tert-butylphenyl)-butyric acid]glycol ester, 4,4'-butylidenebis(6-tertbutyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)-butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl)-2,4,6-trimethylbenzene, 2,6-diphenyl-4-octadecyloxyphenol, tetrakis[methylene-3-(3,5-di-tert-butyl-4-hydroxyphenyl) propionate]methane, 1,3,5-tris(3,5-di-tert-butyl-4-hydroxybenzyl) isocyanurate, 1,3,5-tris[(3,5-di-tert-butyl-4-hydroxyphenyl)propionyloxyethyl]isocyanurate, 2-octylthio-4,6-di(4-hydroxy-3,5-di-tert-butyl)phenoxy-1,3,5-triazine, 4,4'-thiobis(6-tert-butyl-m-cresol), stearyl β-(3-t-butyl-4-hydroxy-5-methylphenyl)-propionate, triethylene glycol bis[β-(3-t-butyl-4-hydroxy-5-methylphenyl)propionate] and 3,9-bis[1,1-dimethyl-2-(β-(3-t-butyl-4-hydroxy-5-methylphenyl)-propionyloxy)ethyl]-2,4,8,10-tetraoxaspiro[5.5]-undecane. Among these phenol antioxidants, esters of β-(3,5-dialkyl-4-hydroxyphenyl)propionic acids and those having an isocyanuric acid ring, for example, stearyl β-(4-hydroxy-3,5-di-tert-butylphenyl)propionate, 1,3,5-tris(2,6-dimethyl-3-hydroxy-4-tert-butylbenzyl) isocyanurate, tetrakis[-methylene-3-(3,5-di-tert-butyl-4-hydroxyphenyl) propionate]methane, 1,3,5-tris(3,5-di-tert-butyl-4-hydroxybenzyl) isocyanurate, 1,3,5-tris[3,5-di-tert-butyl-4-hydroxyphenyl)propionyloxyethyl]isocyanurate, stearyl β-(3-t-butyl-4-hydroxy-5-methylphenyl)propionate, triethylene glycol bis[β-(3-t-butyl-4-hydroxy-5-methylphenyl)propionate]and 3,9-bis[1,1-dimethyl-2-(β-(3-t-butyl-4-hydroxy-5-methylphenyl)propionyloxy)ethyl]-2,4,8,10-tetraoxaspiro[5.5]undecane are highly effective and thus particularly preferable.

The phenol antioxidant may be added in an amount of 0.001 to 5 parts by weight, preferably 0.01 to 3 parts by weight, to 100 parts by weight of the abovementioned polyolefin resin.

Examples of the sulfur antioxidant (b) to be used in the present invention include dialkyl thiodipropionates such as dilauryl, dimyristyl and distearyl thiodipropionates, esters of alkylthiopropionic acids such as butyl-, octyl-, lauryl- and stearylthiopropionic acids with polyhydric alcohols such as glycerol, trimethylolethane, trimethylolpropane, pentaerythritol and trishydroxyethyl isocyanurate, such as pentaerythritol tetrakis-dodecylthiopropionate.

The sulfur antioxidant may be preferably added in an amount of 0.001 to 5 parts by weight, still preferably 0.01 to 3 parts by weight, to 100 parts by weight of the abovementioned polyolefin resin.

The hindered amine light stabilizer (c) to be used in the present invention is a compound having a group represented by the formula

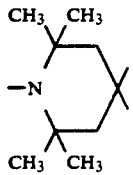

Examples are as follows:
No. 1: 4-benzoyloxy-2,2,6,6-tetramethylpiperidine,
No. 2: bis(2,2,6,6-tetramethyl-4-piperidyl) sebacate,
No. 3: bis(1,2,2,6,6-pentamethyl-4-piperidyl) sebacate,
No. 4: bis(1,2,2,6,6-pentamethyl-4-piperidyl) 2-butyl-2-(3,5-di-tert-butyl-4-hydroxy-benzyl)malonate,
No. 5: bis(1-acryloyl-2,2,6,6-tetramethyl-4-piperidyl) 2,2-bis(3,5-di-tert-butyl-4-hydroxybenzyl)malonate,
No. 6: bis(2,2,6,6-tetramethyl-4-piperidyl-1-oxyl) sebacate,
No. 7: tris(2,2,6,6-tetramethyl-4-piperidyl) nitrilotriacetate,
No. 8 tris(2,2,6,6-tetramethyl-4-piperidyl) butanetricarboxylate,
No. 9: tris(2,2,6,6-tetramethyl-4-piperidyl) trimellitate,
No. 10: tetra(2,2,6,6-tetramethyl-4-piperidyl) 1,2,3,4-butanetetracarboxylate,
No. 11: tris(2,2,6,6-tetramethyl-4-piperidyl) mono(isotridecyl) 1,2,3,4-butanetetracarboxylate,
No. 12: tetra(1,2,2,6,6-pentamethyl-4-piperidyl) 1,2,3,4-butanetetracarboxylate,
No. 13: tris(1,2,2,6,6-pentamethyl-4-piperidyl) mono(isotridecyl) 1,2,3,4-butanetetracarboxylate,
No. 14: bis(1,2,2,6,6-pentamethyl-4-piperidyl) di(tridecyl) 1,2,3,4-butanetetracarboxylate,
No. 15: bis(2,2,6,6-tetramethyl-4-piperidyl) di(tridecyl) 1,2,3,4-butanetetracarboxylate,
No. 16: 3,9-bis[1,1-dimethyl-2-[tris(2,2,6,6-tetramethyl-4-piperidyloxycarbonyl)butylcarbonyloxy]ethyl]-2,4,8,10-tetraoxaspiro-[5.5]undecane,
No. 17: 3,9-bis[1,1-dimethyl-2-[tris(1,2,2,6,6-pentamethyl-4-piperidyloxycarbonyl)butylcarbonyloxy]ethyl]-2,4,8,10-tetraoxaspiro-[5.5]undecane,
No. 18: N-(2,2,6,6-tetramethyl-4-piperidyl)dodecylsuccinimide,
No. 19: 2-butylamino-4,6-bis(9-aza-8,8,10,10-tetramethyl-3-ethyl-1,5-dioxaspiro[5.5]-3-undecylmethoxy)-s-triazine,
No. 20: N,N'-bis[4,6-bis(9-aza-8,8,10,10-tetramethyl-3-ethyl-1,5-dioxaspiro[5.5]-3-undecylmethoxy)-s-triazin-2-yl]piperidine,
No. 21: 1,5,8,12-tetrakis[4,6-bis[N-2,2,6,6-tetramethyl-4-piperidyl)butylamino]-1,3,5-triazin-2-yl]-1,5,8,12-tetraazadodecane,
No. 22: bis(9-aza-8,8,10,10-tetramethyl-3-ethyl-1,5-dioxaspiro[5.5]-3-undecylmethyl) hydrogenated bisphenol A dicarbonate,
No. 23: bis(2,2,6,6-tetramethyl-4-piperidyl) pentaerythritol diphosphite,
No. 24: 1-(2-hydroxyethyl-2,2,6,6-tetramethyl-4-piperidinol/dimethyl succinate polycondensate,
No. 25: 2-tert-octylamino-4,6-dichloro-s-triazine/N,N'-bis(2,2,6,6-tetramethyl-4-piperidyl)-hexamethylenediamine polycondensate,
No. 26 1,6-bis(2,2,6,6-tetramethyl-4-piperidylamino)-hexane/dibromoethane polycondensate,
No. 27: bis(9-aza-8,8,10,19-tetramethyl-3-hydroxymethyl-1,5-dioxaspiro[5.5]-3-undecylmethyl) ether,
No. 28: 3-glycidyl-8-methyl-7,7,9,9-tetramethyl-1,3,8-triazaspiro[4.5]decane-2,4-dione,
No. 29: 3-dodecyl-8-acetyl-7,7,9,9-tetramethyl-1,3,8-triazaspiro[4.5]decane-2,4-dione,
No. 30: 3-octyl-7,7,9,9-tetramethyl-1,3,8-triazaspiro[4.5]decane-2,4-dione,
No. 31: 2,2,4,4-tetramethyl-7-oxa-3,20-diazadispiro-[5.1.11.2]heneicosan-21-one and
No. 32: 3-dodecyl-1-(2,2,6,6-tetramethyl-4-piperidyl)-2,5-pyrrolidinedione.

The hindered amine light stabilizer may be preferably added in an amount of 0.001 to 5 parts by weight, still preferably 0.05 to 1 parts by weight, to 100 parts by weight of the abovementioned polyolefin resin.

Examples of the aliphatic monocarboxylate of a metal belonging to the group Ia or IIb (d) to be used in the present invention include octylates, laurates, myristates, stearates, oleates, ricinoleates and behenates of sodium, potassium, lithium, zinc and cadmium. Among these compounds, an aliphatic monocarboxylate carrying 10 to 20 carbon atoms of a metal belonging to the group Ia is particularly preferable.

The metal salt may be preferably added in an amount of 0.01 to 5 parts by weight, still preferably 0.1 to 3 parts by weight, to 100 parts by weight of the abovementioned polyolefin resin.

Examples of the inorganic filler contained in the abovementioned polyolefin resin include talc, light and heavy calcium carbonate, calcined clay, hard clay, kaolin clay, kieselguhr, acid clay, silicic anhydride, synthetic silicic acid, white carbon, asbestos, alumina, glass flake and glass fiber.

The inorganic filler may be added in an amount of 5 to 100 parts by weight, generally 10 to 50 parts by weight, to 100 parts by weight of the abovementioned polyolefin resin.

In addition, the composition of the present invention may contain a phosphorus compound such as a phosphite to thereby further improve the light and heat resistances. Examples of the phosphorus compound include tridecyl phosphite, octyl diphenyl phosphite, tris(2,4-di-tert-butylphenyl) phosphite, triphenyl phosphite, tris(butoxyethyl) phosphite, tris(nonylphenyl) phosphite, distearyl pentaerythritol disphospite, hexa(tridecyl) 1,1,3-tris(2-methyl-5-tert-butyl-4-hydroxyphenyl)butane triphosphite, tetra (mixed $C_{12}$-$C_{15}$ alkyls) 4,4'-isopropylidenediphenyl diphosphite, tetra(tridecyl) 4,4'-butylidenebis(3-methyl-6-tert-butylphenyl) disphosphite, tris(3,5-di-tert-butyl-4-hydroxyphenyl) phosphite, tris(mono- and di-mixed nonylphenyl) phosphite, hydrogenated 4,4'-isopropylidenediphenol polyphosphite, bis(octylphenyl) bis [4,4'-butylidenebis(3-methyl-6-tert-butylphenyl)]1,6-hexanediol diphosphite, phenyl 4,4'-isopropylidenediphenol pentaerythritol disphosphite, bis(2,4-di-tert-butylphenyl) pentaerythritol disphosphite, bis(2,6-di-tert-butyl-4-methylphenyl) pentaerythritol disphoshite, tris[4,4'-isopropylidenebis(2-tert-butylphenyl)]phosphite, di(nonylphenyl) pentaerythritol disphosphite, 4,4'-isopropylidenebis(2-tert-butylphenol) di(nonylphenyl) phosphite, 9,10-dihydro-9-oxa-10-phosphaphenathrene 10-oxide and tetrakis(2,4-di-tert-butylphenyl) 4,4'-biphenylenediphosphonite. Among these compounds, tris(2,4-di-tert-butylphenyl) phosphite, distearyl pentaerythritol diphosphite, bis(2,4-di-tert-butylphenyl) pentaerythritol disphosphite, bis(2,6-di-tert-butyl-4-methylphenyl) pentaerythritol diphosphite and tetrakis(2,4-di-tert-butylphenyl) 4,4'-biphenylenediphosphonite are particularly effective and thus preferable.

The phosphorus compound may be preferably added in an amount of 0.001 to 5 parts by weight, still preferably 0.01 to 3 parts by weight, to 100 parts by weight of the abovementioned polyolefin resin.

The composition of the present invention may contain an UV absorber to thereby further improve the light resistance. Examples of the UV absorber include benzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone, benzotriazoles such as 2-(2'-hydroxy-3'-t-butyl-5'-methylphenyl)-5-chlorobenzotriazole, 2-(2'-hydroxy-3,40 ,5'-di-t-butylphenyl)-5-chlorobenzotriazole, 2-(2'-hydroxy-5'-methylphenyl)-benzotriazole and 2-(2'-hydroxy-3',5'-di-t-amylphenyl)-benzotriazole, benzoates such as phenyl salicylate, p-t-butylphenyl salicylate, 2,4-di-t-butylphenyl 3,5-di-t-butyl-4-hydroxybenzoate and hexadecyl 3,5-di-t-butyl-4-hydroxybenzoate, substituted acrylonitriles such as methyl α-cyano-β-methyl-β-(p-methoxyphenyl)acrylate and oxalic diamides such as N-2-ethylphenyl-N'-2-ethoxy-5-tert-butylphenyloxalic diamide.

The composition of the present invention may further contain various additives such as nucleating agent, organic tin compound, plasticizer, epoxy compound, pigment, foaming agent, antistatic agent, fire retardant, lubricant or processing aid, if desired.

To further illustrate the present invention, and not by way of limitation, the following Examples will be given.

Example 1

The following composition was pelletized by extrusion at 250° C. Then these pellets were injection molded at 250° C. into a test piece of 1 mm in thickness. The weather resistance of this piece was evaluated with a sunshine weatherometer at a black panel temperature of 83° C. while the heat resistance thereof was evaluated in a geer oven at 150° C. For comparison, a composition containing no talc filler was treated in the same manner.

Table 1 shows the results.

| Composition: | |
| --- | --- |
| | part by weight |
| polypropylene (Profax 6501) | 100 |
| talc | 30 |
| tetrakis[methylene-β-(3,5-di-t-butyl-4-hydroxyphenyl) propionate]methane | 0.1 |
| additive (cf. Table 1) | cf. Table 1 |

TABLE 1

| No. | Additive | Amount (part by weight) | Weather resistance (hr) | Heat resistance (hr) |
| --- | --- | --- | --- | --- |
| | Comparative Example (containing no talc) | | | |
| 1-1 | none | | 180 | 550 |
| 1-2 | DSTDP*[1] | 0.3 | 240 | 2180 |
| 1-3 | HALS*[2] cpd. No. 10 | 0.3 | 1500 | 1260 |
| 1-4 | DSTP | 0.3 | 780 | 1950 |
| | HALS*[2] cpd. No. 10 | 0.3 | | |
| | Comparative Example (containing talc) | | | |
| 1-5 | none | — | 120 | 20 |
| 1-6 | DSTDP | 0.3 | 180 | 340 |
| 1-7 | HALS cpd. No. 10 | 0.3 | 1020 | 500 |
| 1-8 | DSTPD | 0.3 | 660 | 1170 |
| | HALS cpd. No. 10 | 0.3 | | |
| 1-9 | DSTDP | 0.3 | 660 | 1080 |
| | HALS cpd. No. 10 | 0.3 | | |
| | calcium stearate | 0.3 | | |
| | Example (containing talc) | | | |
| 1-1 | DSTDP | 0.3 | 1260 | 1270 |
| | HALS cpd. No. 10 | 0.3 | | |
| | sodium stearate | 0.3 | | |
| 1-2 | DSTDP | 0.3 | 1280 | 1250 |
| | HALS cpd. No. 10 | 0.3 | | |
| | sodium laurate | 0.3 | | |
| 1-3 | DSTDP | 0.3 | 1200 | 1220 |
| | HALS cpd. No. 10 | 0.3 | | |
| | potassium stearate | 0.3 | | |
| 1-4 | DSTDP | 0.3 | 1140 | 1170 |
| | HALS cpd. No. 10 | 0.3 | | |

TABLE 1-continued

| No. | Additive | Amount (part by weight) | Weather resistance (hr) | Heat resistance (hr) |
|---|---|---|---|---|
| | zinc stearate | 0.3 | | |

*[1]DSTDP: distearyl thiodipropionate.
*[2]: a hindered amine light stabilizer.

Example 2

A test piece was prepared from the following composition in the same manner as the one described in Example 1. The weather resistance of the piece was evaluated with a sunshine weatherometer at a black panel temperature of 83° C. while the heat resistance thereof was evaluated in a geer oven at 150° C.

Table 2 shows the results.

| Composition: | part by weight |
|---|---|
| polypropylene (Profax 6501) | 100 |
| calcium stearate | 0.05 |
| talc | 30 |
| 1,3,5-tris-(3,5-di-t-butyl-4-hydroxybenzyl) isocyanurate | 0.1 |
| additive (cf. Table 2) | cf. Table 2 |

TABLE 2

| No. | Additive | Amount (part by weight) | Weather resistance (hr) | Heat resistance (hr) |
|---|---|---|---|---|
| | | Comparative Example | | |
| 2-1 | none | — | 120 | 20 |
| 2-2 | DMTDP* | 0.3 | 180 | 320 |
| 2-3 | HALS cpd. No. 2 | 0.5 | 960 | 480 |
| 2-4 | sodium stearate | 0.3 | 120 | 20 |
| 2-5 | DMTDP | 0.3 | 620 | 1030 |
| | HALS cpd. No. 2 | 0.5 | | |
| 2-6 | DMTDP | 0.3 | 180 | 350 |
| | sodium stearate | 0.3 | | |
| 2-7 | HALS cpd. No. 2 | 0.5 | 980 | 500 |
| | sodium stearate | 0.3 | | |
| 2-8 | DMTDP | 0.3 | 620 | 1010 |
| | HALS cpd. No. 2 | 0.5 | | |
| | calcium stearate | 0.3 | | |
| | | Example | | |
| 2-1 | DMTDP | 0.3 | 1280 | 1160 |
| | HALS cpd. No. 2 | 0.5 | | |
| | sodium stearate | 0.3 | | |
| 2-2 | DMTDP | 0.3 | 1250 | 1120 |
| | HALS cpd. No. 2 | 0.5 | | |
| | sodium laurate | 0.3 | | |

*DMTDP: dimyristyl thiodipropionate.

Example 3

A test piece was prepared from the following composition in the same manner as the one described in Example 1. The weather resistance of the piece was evaluated with a sunshine weatherometer at a black panel temperature of 83° C.

Table 3 shows the results.

| Composition: | part by weight |
|---|---|
| polypropylene (Profax 6501) | 100 |
| talc | 30 |
| tetrakis[methylene-β-3,5-di-t-butyl-4-hydroxyphenyl) propionate]methane | 0.3 |
| HALS compound No. 10 | 0.3 |
| distearyl thiodipropionate (DSTDP) | 0.3 |
| metal salt (cf. Table 3) | cf. Table 3 |

TABLE 3

| No. | Metal salt | Amount (part by weight) | Weather resistance (hr) | Improvement (%) |
|---|---|---|---|---|
| | | Comparative Example | | |
| 3-1 | none (no DSTDP) | — | 1020 | (100) |
| 3-2 | none | — | 660 | (0) |
| 3-3 | calcium stearate | 0.1 | 660 | (0) |
| 3-4 | calcium stearate | 0.3 | 660 | (0) |
| | | Example | | |
| 3-1 | sodium stearate | 0.1 | 980 | 89 |
| 3-2 | sodium stearate | 0.2 | 1100 | 122 |
| 3-3 | sodium stearate | 0.3 | 1260 | 167 |
| 3-4 | sodium stearate | 0.5 | 1300 | 178 |
| 3-5 | sodium laurate | 0.1 | 960 | 83 |
| 3-6 | sodium laurate | 0.2 | 1160 | 139 |
| 3-7 | sodium laurate | 0.3 | 1280 | 172 |
| 3-8 | zinc stearate | 0.1 | 920 | 72 |
| 3-9 | zinc stearate | 0.2 | 1020 | 100 |
| 3-10 | zinc stearate | 0.3 | 1140 | 133 |

Example 4

A test piece was prepared from the following composition in the same manner as the one described in Example 1. The weather resistance of the piece was evaluated with a sunshine weatherometer at a black panel temperature of 83° C. For comparison, a sample containing no sodium stearate (Na-St) was treated in the same manner.

Table 4 shows the results.

| Composition: | part by weight |
|---|---|
| polypropylene (Profax 6501) | 100 |
| calcium stearate | 0.05 |
| talc | 30 |
| tetrakis[methylene-β-3,5-di-t-butyl-4-hydroxyphenyl) propionate]methane | 0.1 |
| distearyl thiodipropionate | 0.3 |
| sodium stearate | 0.3 |
| HALS compound (cf. Table 4) | cf. Table 4 |

TABLE 4

| | | Weather resistance (hr) | |
|---|---|---|---|
| No. | HALS compound | Na-St added | No Na-St |
| 4-1 | No. 2 | 1140 | 650 |
| 4-2 | No. 12 | 1420 | 780 |
| 4-3 | No. 14 | 1200 | 660 |
| 4-4 | No. 15 | 1330 | 720 |
| 4-5 | No. 17 | 1450 | 810 |
| 4-6 | No. 18 | 1330 | 800 |
| 4-7 | No. 24 | 1040 | 600 |
| 4-8 | No. 25 | 1100 | 640 |
| 4-9 | No. 26 | 1080 | 600 |

Tables 1 to 4 suggest the following facts.

In the case of the compositions containing no talc filler, satisfactory resistances to weather and to heat can be obtained in a two-component system comprising a phenol anitoxidant and an HALS. On the other hand, in the case of those containing a talc filler, said two-component system shows an insufficient heat resistance. A three-component system prepared by adding a sulfur antioxidant thereto shows an improved heat resistance but a significantly lowered weather resistance. The addition of commonly employed calcium stearate to the three-component system exerts no positive effect but rather lowers the heat resistance.

In contrast thereto, the composition prepared by adding a specific metal salt of the present invention to the abovementioned three-component system shows an unexpectedly improved weather resistance without showing any decrease in the heat resistance. The weather resistance of this composition is sometimes higher than that achieved by using the two-component system as described above containing no sulfur antioxidant.

What is claimed is:

1. A stabilized polyolefin resin composition prepared by adding (a) a phenol anitoxidant, (b) a sulfur antioxidant, (c) a hindered amine light stabilizer and (d) an aliphatic monocarboxylate of a metal belonging to the group Ia or IIb to a polyolefin resin containing from 10 to 50 parts by weight of talc as an inorganic filler, to 100 parts by weight of said polyolefin resin.

2. The polyolefin resin composition as set forth in claim 1, wherein 0.001 to 5 parts by weight of said phenol antioxidant (a) 0.001 to 5 parts by weight of said sulfur antioxidant, (b) 0.001 to 5 parts by weight of said hindered amine light stabilizer, (c) and 0.01 to 5 parts by weight of said aliphatic monocarboxylate of a metal belonging to the group Ia or IIb are added to 100 parts by weight of said polyolefin resin containing from 10 to 50 parts by weight of talc as the inorganic filler.

3. The polyolefin resin composition of claim 2, wherein said polyolefin resin is selected from among poly-α-olefins and α-olefin copolymers selected from the group consisting of low-density polyethylene, high-density poly-ethylene, linear low-density polyethylenes, polypropylene, propylene/ethylene copolymer, polybutene-1, poly-3-methylbutene, poly-4-methylpentene and ethylene/vinyl acetate copolymer.

4. The polyolefin resin composition of claim 3, wherein said polyolefin resin is an ethylene/α-olefin ($C_3$–$C_8$) copolymer.

5. The polyolefin resin composition of claim 2, wherein said polyolefin resin is an ethylene/butene-1 copolymer; polypropylene, propylene/ethylene copolymer, polybutene-1, or poly-3-methylbutene, poly-4-methylpentene and ethylene/vinyl acetate copolymer;

said phenol antioxidant is 2,6-di-tert-butyl-p-cresol, stearyl (3,5-dimethyl-4-hydroxybenzyl)-thioglycolate, stearyl 8-(4-hydroxy-3,5-di-tert-4-hydroxybenzylphosphonate, 2,4,6-tris(3',5'-di-tert-butyl-4'-hydrohybenzylthio)1,3,5-triazine, distearyl(4-hydroxy-3-methyl-5-tert-butyl)benzylmalonate, 2,4'-methylenebis(4-methyl-6-tertbutylphenol), 4,4'-methylenebis(2,6-di-tert-butylphenol), 2,2'--methylenebis[6-(1-methylcyclohexyl)-p-cresol], bis[3,5-bis(4-hydroxy-3-tert-butylphenyl)butyric acid]glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)-butane, bis[2-tert-butyl-4-methyl-6-(2-hydroxy-3-tert-butyl-5methylbenzyl)phenyl]terephthalate,1,3,5-tris(2,6-dimethyl-3-hydroxy-4-tert-butylbenzyl) isocyanurate, 1,3,5-tris(3,5-di-tert-butyl-4-hydroxy-benzyl)-2,4,6-trimethyl-benzene, 2,6-diphenyl-4-octadecyloxyphenol, tetrakis[-methylene-3-(3,5-di-tert-butyl-4-hydroxyphenyl)-propionate]methane, 1,3,5-tris[(3,5-di-tert-butyl-4-hydroxybenzyl) isocyanurate,]1,3,5-tris[(3,5-di-tert-butyl-4-hydroxyphenyl)propionyloxyethyl-]isocyanurate,2-octylthio-4,6-di(4-hydroxy-3,5-di-tert-butyl)phenoxy-1,3,5-triazine, 4,4'-thiobis(6-tert-butyl-m-cresol), stearyl β-(3-t-butyl-4-hydroxy-5-methylphenyl)-propionate, tuethylene glycol bis [β-(3-t-butyl-4-hydroxy-5-methylphenyl)propionate] and 3,9-bis[1,1-dimethyl-2-(8-(3-t-butyl-4-hydroxy-5-methylphenyl)-propionyloxy)ethyl]-2,4,8,10-tetraoxaspiro [5.53]-undecane.

said sulfur antioxidants are dilauryl, dimyristyl and distearyl thiodipropionates; esters of butyl-, octyl-, lauryl- and stearylthiopropionic acids with glycerol, trimethylolethane, trimethylol-propane, pentaerythritol and trishydroxyethyl isocyanurate;

said hindered amine light stabilizer is 4-benzoyloxy-2,2,6,6-tetramethylpiperidine, bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)-butyl-2-(3,5-di-tert-butyl-4-hydroxy-benzyl)malonate, bis(1-acryloyl-2,2,6,6-tetramethyl-4-piperidyl) 2,2-bis(3,5-di-tert-butyl-4-hydroxybenzyl)malonate, bis(2,2,6,6-tetramethyl-4-piperidyl-1-oxyl)sebacate, tris(2,2,6,6-tetramethyl-4-piperidyl) nitrilotriacetate, tris(2,2,6,6-tetramethyl-4-piperidyl) butanetricarboxylate, tris(2,2,6,6-tetramethyl-4-piperidyl) trimellitate, tetra(2,2,6,6-tetramethyl-4-piperidyl) 1,2,3,4-butanetetracarboxylate, tris(2,2,6,6-tetramethyl-4-piperidyl)mono(isotridecyl) 1,2,3,4-butanetetracarboxylate, tetra(1,2,2,6,6-pentamethyl-4-piperidyl) 1,2,3,4-butanetetracarboxylate, tris(1,2,2,6,6-pentamethyl-4-piperidyl) mono(isotridecyl) 1,2,3,4-butanetetra-carboxylate, bis(1,2,2,6,6-pentamethyl-4-piperidyl)di(tridecyl) 1,2,3,4-butanetetracarboxylate, bis(2,2,6,6-tetramethyl-4-piperidyl)-di(tridecyl)1,2,3,4-butanetetracarboxylate, 3,9-bis[1,1-dimethyl-2-]tris(2,2,6,6-tetramethyl-4-piperidyloxycarbonyl)butyl-carbonyloxy]ethyl3-2,4,8,10-tetraoxaspiro-[5.5]undecane, 3,9-bis[1,1-dimethyl-2-tris(1,2,2,6,6-pentamethyl-4-piperidyloxycarbonyl)butyl-carbonyloxy[ethyl]-2,4,8,10-tetraoxaspiro-[5.5]undecane, N-(2,2,6,6-tetramethyl-4-piperidyl)dodecyl-succinimide, 2-butylamino-4,6-bis(9-aza-8,8,10,10-tetra-methyl-3-ethyl-1,5-dioxaspiro[5.5]-3 -undecylmethoxy)-s-triazine, N,N'-bis[4,6-bis(9-aza-8,8,10,10-tetramethyl-3-ethyl-1,5-dioxaspiro[5.5]-3-undecylmethoxy)-s-triazin-2-yl]piperidine, 1,5,8,12-tetrakis[4,6-bis[N-2,2,6,6-tetramethyl-4-piperidyl)butylamino]-1,3,5-triazin-2-yl]-1,5,8,12-tetraazadodecane, bis(9-aza-8,8,10,10-tetramethyl-3-ethyl-1,5-dioxaspiro[5.5]-3-undecylmethyl)hydrogenated bisphenol A dicarbonate, bis(2,2,6,6-tetramethyl-4-piperidyl) pentaerythritol diphosphite, 1-(2-hydroxymethyl-2,2,6,6-tetramethyl-4-piperidinol/dimethyl succinate polycondensate, 2-tert-octylamino-4,6-dichloro-s-triazine/N,N'-bis(2,2,6,6-tetramethyl-4-piperidyl)-hexamethylenediamine polycondensate, 1,6-bis(2,2,6,6-tetramethyl-4-piperidylamino)hexane/dibromoethane polycondensate, bis(9-aza-8,8,10,19-tetramethyl-3-hydroxy-methyl-1,5-dioxaspiro[5.5]-3-undecylmethyl) ether, 3-glycidyl-8-methyl-7,7,9,9-tetramethyl-1,3,8-triazaspiro[4.5]- decane-2,4-dione, 3-dodecyl-8-acetyl-7,7,9,9-tetramethyl-1,3,8-triazaspiro[4.5]decane-2,4-dione, 3-octyl-7,7,9,9-tetramethyl-1,3,8-triazaspiro[4.5]decane-2,4-dione, 2,2,4,4-tetramethyl-7-oxa-3,20-diazadispiro [5.1.11.2]heneicosan-21-one and or 3-dodecyl-1-(2,2,6,6-tetramethyl-4-piperidyl)-2,5-pyrrolidinedione.

6. The polyolefin composition of claim 5, wherein said aliphatic monocarboxylate of metal belonging to the group Ia or IIb is an octylate, laurate, myristate, stearate, oleate, ricinoleate and behenate of sodium, potassium, lithium, zinc and cadmium.

* * * * *